United States Patent [19]
Whitaker et al.

[11] 3,883,244
[45] May 13, 1975

[54] APERTURE ADJUSTMENT IN OPTICAL ASSEMBLY

[75] Inventors: Raymond Whitaker, Leeds; Bryan S. Haslam, Harrogate, both of England

[73] Assignee: Xerox Corporation, Stamford, Conn.

[22] Filed: June 19, 1973

[21] Appl. No.: 371,457

[30] Foreign Application Priority Data
June 23, 1972 United Kingdom............ 29652/72

[52] U.S. Cl. ............... 355/71; 352/181; 354/196
[51] Int. Cl. ............................................ C03b 27/72
[58] Field of Search ............. 95/44 R, 64 A, 45; 352/180, 181; 350/187, 206; 353/97; 355/71, 55, 58; 354/196

[56] References Cited
UNITED STATES PATENTS

| | | | |
|---|---|---|---|
| 1,950,166 | 3/1934 | Durholz | 95/45 |
| 3,106,883 | 11/1963 | Erbe | 95/64 A |
| 3,221,628 | 12/1965 | Mahn | 95/45 |
| 3,370,907 | 2/1968 | Cox et al. | 352/140 |
| 3,385,186 | 5/1968 | Schwarz | 95/44 R X |
| 3,541,941 | 11/1970 | Barr | 95/45 |
| 3,591,256 | 7/1971 | Hoyer et al. | 350/206 |

*Primary Examiner*—Fred L. Braun
*Assistant Examiner*—E. M. O'Connor
*Attorney, Agent, or Firm*—Robert J. Bird

[57] ABSTRACT

In an optical projection system the objective lens system is positioned for movement along a shaft parallel to the optical axis of the lens system. A variable aperture iris diaphragm is mounted on the lens assembly. An external gear is operatively connected to the adjustable diaphragm and the gear is rotated by a pinion keyed to a biasing shaft for combined rotation and axial movement in a helical locus relative to the biasing shaft. The biasing shaft is also located along the optical axis, and thus the diaphragm aperture is adjusted by means of the external gear when the lens assembly, gear and pinion are moved along the optical axis.

2 Claims, 3 Drawing Figures

APERTURE ADJUSTMENT IN OPTICAL ASSEMBLY

This invention relates to apparatus for automatically adjusting the aperture in an optical assembly which is movable to any one of a plurality of selected positions.

The invention is particularly, although not exclusively, useful in the lens assembly of an optical projection system in which the lens is movable to different positions to produce different magnifications. One such optical projection system is described in co-pending patent application Ser. No. 371,654, now U.S. Pat. No. 3,855,482 relates to an electrostatographic copying machine in which three different magnification modes for copying are achieved by moving the lens assembly along the optical path through the lens. In this arrangement, if no aperture adjustment or other exposure change is made, the problem arises that in the different magnification modes, different exposures will result.

It is an object of the present invention to provide an optical assembly in which this problem is overcome.

According to the present invention there is provided an automatic aperture adjustment apparatus for an optical assembly comprising means for driving the optical assembly to any one of a plurality of positions along an optical path through the assembly, and means operable by movement of the assembly to vary the aperture of the optical assembly in accordance with the position of the assembly along said path.

An optical assembly incorporating an automatic aperture adjustment apparatus in accordance with the invention will now be described, by way of example only, with reference to the accompanying drawings, in which.

Figure 1:
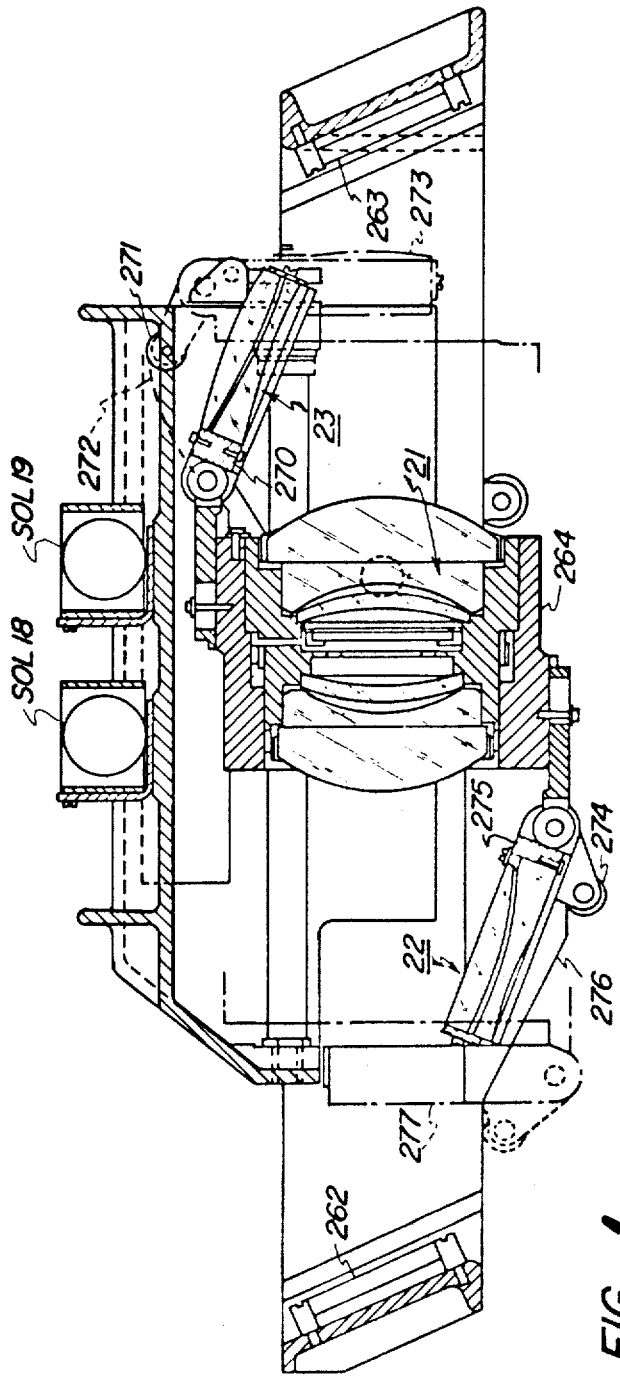
FIG. 1 is a cross-section through an optical assembly.

Referring to FIG. 1, there is shown the optical assembly of an electrostatographic copying machine which has three magnification modes.

The three magnification modes are a 100% mode, in which the copy is substantially the same size as the original document; and two reduction modes, in which the copy is respectively 70% and 50% of the size of the original document. In the 70% mode only the main lens 21 is used, whereas in the 100% mode, add lens 22 is swung into the optical path as the main lens 21 is moved to a position closer to a first mirror 262. In the 50% mode, the main lens 21 is used in conjunction with add-lens 23, which is moved into the optical path as the main lens is moved towards a second mirror 263. The add-lenses 22 and 23 are swung into and out of the optical path as the main lens moves by means of ramp cams.

Figure 2:
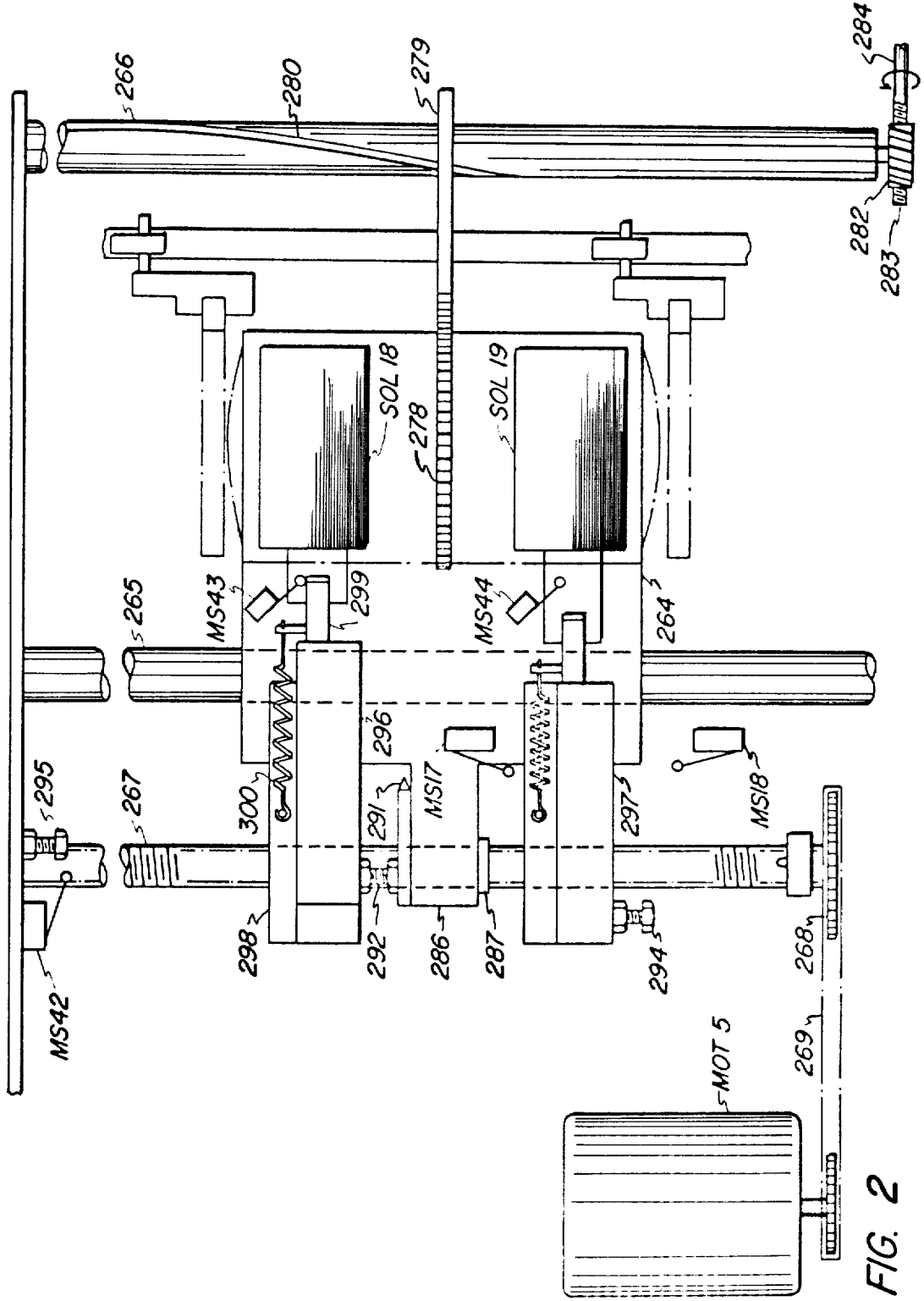
FiG. 2 is a diagrammatic plan view of the mechanical control and drive systems of the assembly of FIG. 1.

Referring now also to FIG. 2 the main lens 21 and the add-lenses 22 and 23 are mounted on a lens carriage 264. The lens carriage 264 is mounted for sliding motion parallel with the optical path through the main lens on shafts 265 and 266 that are mounted in the optical system casting. Shaft 265 is fixed relative to the optical system casting, whereas shaft 266 is mounted for angular movement about its longitudinal axis for reasons to be described below. The lens carriage 264 may be driven along the shafts 265 and 266 by means of a lead screw 267 which is mounted for rotation about its longitudinal axis, which is parallel to the shafts 265 and 266, relative to the optical system casting. The lead screw may be rotated in either direction by means of a reversable drive motor MOT 5, through a toothed pulley 268 secured to the lead screw 267, and a toothed belt 269.

In order to position the main lens for the three magnification modes, positive steps are provided on the optical system casting. Furthermore, in order to ensure that inaccuracies in positioning do not arise due to backlash between the lead screw and its co-operating lead screw nut (carried by the lens carriage) the lens carriage 264 is always driven in the same direction against the stops whenever it is repositioned.

Figure 3:
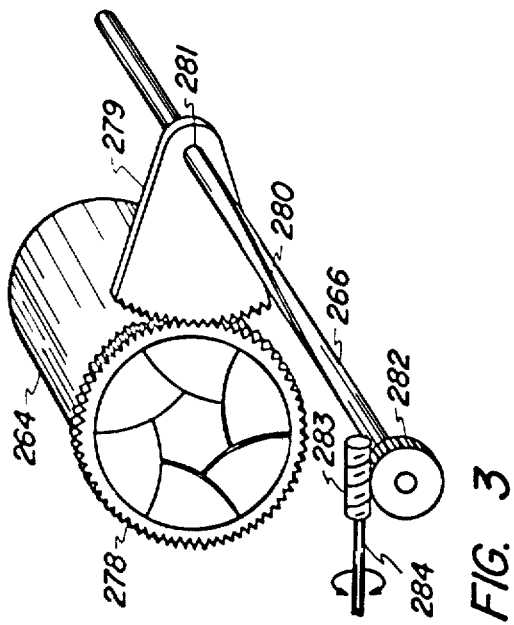
FIG. 3 is a perspective view of a detail of the optical assembly, particularly illustrating the present invention.

In order to ensure that constant exposure is achieved regardless of the magnification mode, an automatic aperture adjusting device is incorporated, as will be described with particular reference to FIGS. 2 and 3. The lens carriage 264 carries a toothed ring 278 which is engaged by co-operating teeth of a toothed quadrant 279. The toothed ring 278 is coupled to an iris diaphragm, so that movement of the quadrant about its axis causes aperture changes. The quadrant is held for movement along the optical path with the lens carriage 264, but is caused to rotate about its axis as the lens carriage moves by means of the shaft 266 which passes through an aperture 281 in the quadrant 279, the axis of shaft 266 coinciding with the axis of the quadrant 279. Shaft 266 (although mounted for angular movements in the optical system casting, as mentioned above) is normally held stationary relative to the optical system casting, and is provided with a helical keyway in the form of a groove 280 which is engaged by a key projecting from the aperture 281 in the quadrant through which shaft 266 passes. In this way, the aperture of this iris diaphragm may be controlled to provide constant exposure whichever magnification mode is selected.

In order to allow for the possibility of operator control of the lens aperture, to vary the intensity or contrast of an image, provision is made for biassing the automatic aperture change just described. To do this it is necessary only to move the helically-grooved shaft 266 angularly about the axis. This is done by mounting the shaft 266 in bearings in the optical system casting, and arranging a worm wheel 282 on the shaft 266 to mesh with a worm gear 283 connected directly to an operator control by means, for example, of a flexible drive cable 284.

What we claim is:

1. Optical apparatus for projecting an image of an object and including:

a lens assembly disposed along an optical axis and movable therealong relative to said object to vary the magnification of said image relative to said object, a variable aperture iris diaphragm disposed on said lens assembly to control the rate of light exposure therethrough and an external gear operatively connected to said iris diaphragm and rotatable relative to said lens assembly, a stationary bearing shaft extending parallel to said optical axis, said lens assembly being operatively connected to said stationary shaft for sliding movement therealong, a biasing shaft extending parallel to said optical axis, a drive pinion keyed to said biasing shaft for combined rotation and axial movement in a helical locus relative to said biasing shaft, said drive pinion being in operative engagement with said external gear and effective to rotate said external gear when said lens assembly, said gear and said pinion move along said optical axis, whereby said variable aperture iris diaphragm is adjusted in response to movement of said lens assembly along said optical axis.

2. Optical apparatus as defined in claim 1 in which said biasing shaft is held stationary to provide a reaction to effect the helical movement of said pinion in response to movement of said lens assembly, and said biasing shaft is rotatable to permit prior adjustment of said iris diaphragm.

* * * * *